Dec. 13, 1955        R. G. FERRIS        2,726,635
CATTLE FEEDING DEVICE
Filed Nov. 26, 1952        2 Sheets-Sheet 1
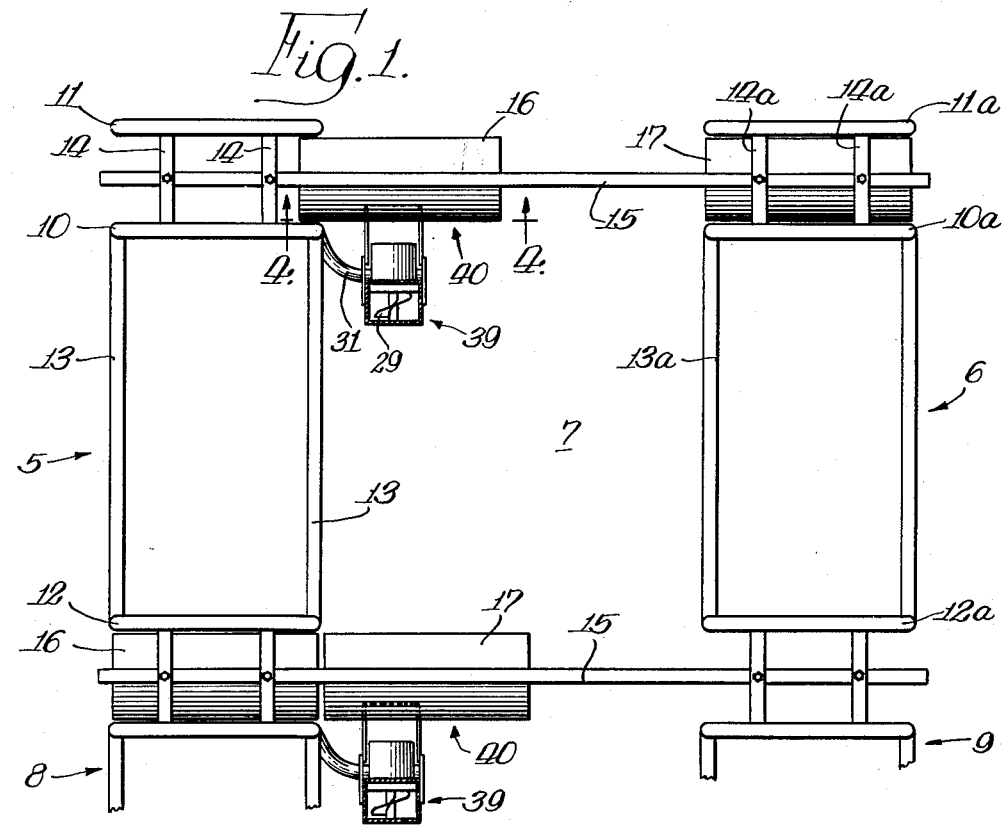
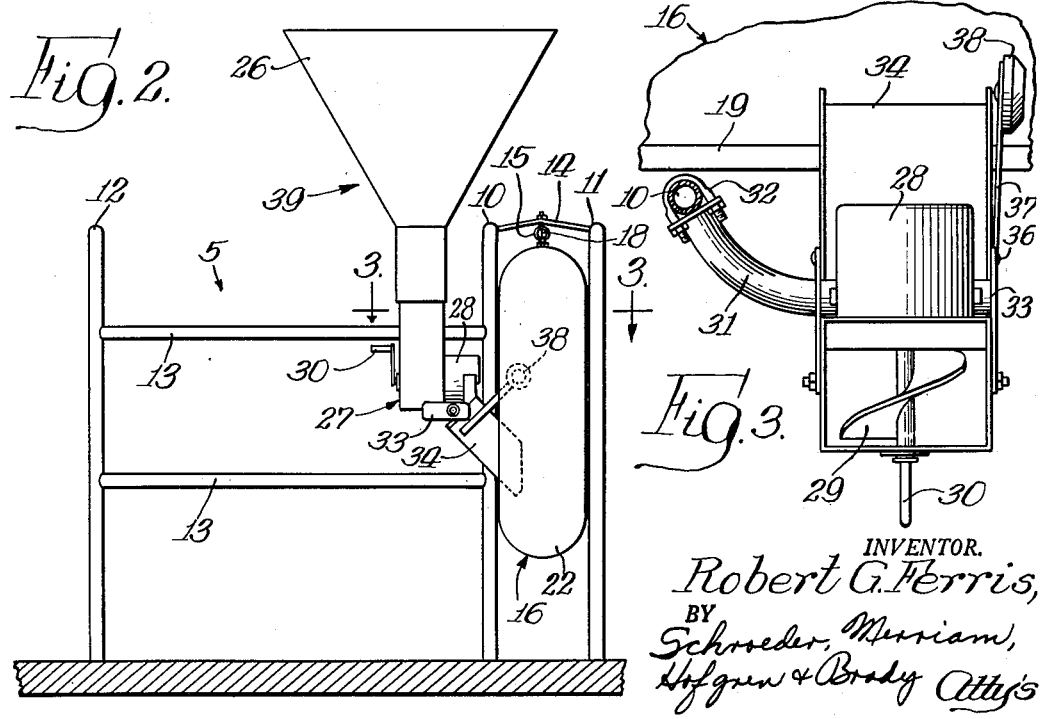
INVENTOR.
Robert G. Ferris,
BY
Schroeder, Merriam,
Hofgren & Brady Attys Dec. 13, 1955  R. G. FERRIS  2,726,635
CATTLE FEEDING DEVICE
Filed Nov. 26, 1952  2 Sheets-Sheet 2
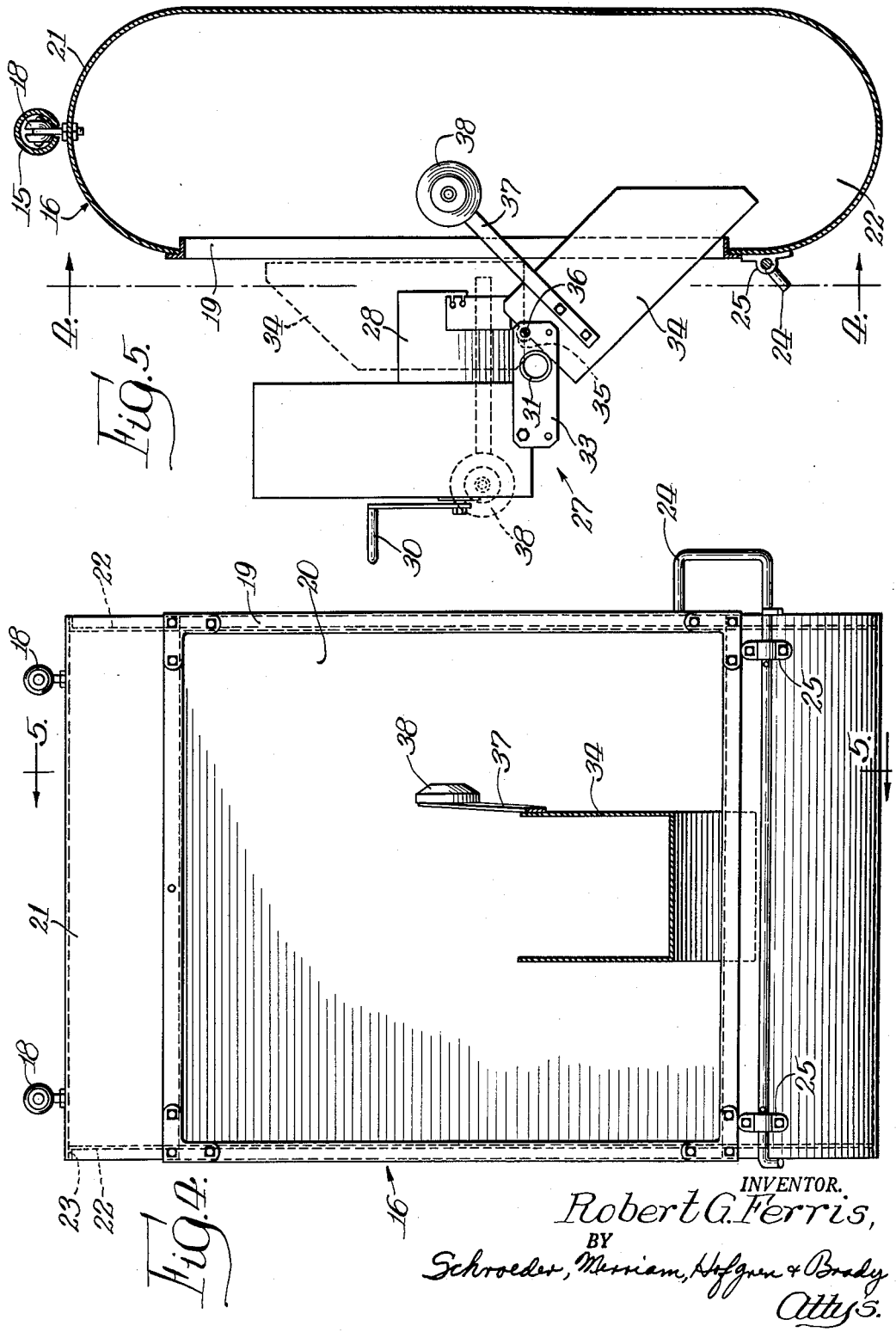
INVENTOR.
Robert G. Ferris,
BY
Schroeder, Merriam, Hofgren & Brady
Attys.

United States Patent Office 2,726,635
Patented Dec. 13, 1955

2,726,635
CATTLE FEEDING DEVICE

Robert G. Ferris, Harvard, Ill., assignor to Starline, Inc., a corporation of Illinois Application November 26, 1952, Serial No. 322,652

8 Claims. (Cl. 119—51)

This invention relates to an improved cattle feeding device; and in particular it relates to a device in which a pair of feed boxes each of which serves a feeding stall may be moved to a filling station where either box may be filled from a single hopper of feed.

One of the well known arrangements for milking and feeding stalls for the handling of dairy cattle is the tandem arrangement, in which there are two or more stalls arranged in tandem on opposite sides of an alley. In this arrangement the feed boxes are commonly mounted on an overhead track so that they furnish the gates for the ends of the stalls. The feed boxes may be filled and placed in position at the ends of the first stalls in the feeding and milking parlor, and a cow may be driven into each stall where it may feed while it is milked. When the cows are in the first stalls the feed boxes for the second stalls may be moved into position behind them and two more cows herded into the second pair of stalls.

Heretofore it has been customary to provide a feed hopper and a feed delivery device to fill each of the feed boxes in the milking parlor. The hoppers and feed delivery devices are relatively expensive, and they have been mounted in such a way that the feed boxes must be produced in right and left handed models for use on the two sides of the alley, so that each feed delivery device may feed directly into the associated feed box. The customary construction also weakens the feed box because the upright frame member at one margin of the feed box must be broken to accommodate the end of the feed delivery device.

In the improved combination here disclosed, a single hopper and feed delivery device is used for both feed boxes in a pair, thus eliminating the cost of one hopper and one feed delivery device. Another important cost consideration resides in the fact that milking parlors are usually put in a separate building which is specially built for the purpose, and the use of a single feed hopper and delivery device permits the alley between the stalls to be eighteen inches narrower than is possible with two such units. In a 20 foot long building this reduces the floor space by 30 square feet. Each feed box may be moved to a filling station in front of a feed delivery device which has a pivoted delivery chute which may be lowered into a feed box in the filling station, or retracted to permit return of the box to its position closing the end of the feeding stall. This arrangement eliminates the need for making two different types of feed boxes, and also permits a stronger feed box construction which results from having unbroken upright frame members at the four margins of the openings in the box.

The invention is illustrated in a preferred embodiment in the accompanying drawings in which:

Fig. 1 is a plan view of a pair of feeding stalls in accordance with the invention, a second pair of stalls being shown fragmentarily, and the feed hoppers being removed to show the feed delivery devices and delivery chute;

Fig. 2 is a side elevation viewing the left hand stall of Fig. 1 from the alley;

Fig. 3 is an enlarged fragmentary sectional view taken as indicated along the line 33 of Fig. 2;

Fig. 4 is an enlarged sectional view taken as indicated along the line 4—4 of Fig. 1; and Fig. 5 is a section taken as indicated along the line 5—5 of Fig. 4.

Referring to the drawings in greater detail, and referring first to Fig. 1, the unit as illustrated includes a left hand feeding stall 5 and a right hand feeding stall 6 which are in aligned positions on opposite sides of an alley 7. A second left hand feeding stall 8 and a second right hand feeding stall 9 are in tandem, respectively, with the feeding stalls 5 and 6. As seen in Fig. 2, the feeding stall 5 has a front arch 10, a rear arch 12 and side rails 13. An extra arch 11 is spaced forwardly of the front arch 10, and extending between the arches 10 and 11 are cross members 14 from which are suspended a track 15 which may conveniently be of the tubular type commonly used in barn equipment construction. As seen in Fig. 1, the rear arch 12 of the feeding stall 5 is spaced in front of the front arch for the feeding stall 8, so that the stalls are identical and an extra arch 11 is needed only for the first stall 5 or 6 of a tandem series. As seen in Fig. 1, the track 15 extends entirely across the alley 7 and across the front of the right hand feeding stall 6 where it is supported on cross members 14a which extend between the front arch 10a of the right hand feeding stall 6, and an extra arch 11a.

Mounted on the track 15 are a pair of feed boxes 16 and 17 which are suspended from small wheeled carriages 18 in the tubular track 15. As best seen in Figs. 4 and 5 the feed boxes 16 and 17 have rectangular frames 19 which surround the open side 20 of the feed boxes, and a single back panel 21 which is spaced behind the frame 19 and has its upper and lower ends curved forwardly and secured to the top and bottom of the rectangular frame 19 to form a generally oval upright feed box. Oval end panels 22 are provided with continuous peripheral flanges 23 by means of which they are spot welded to the periphery of the back panel 21. The feed boxes are provided with a bar lock 24 which is pivoted in straps 25 riveted to the back panel immediately below the frame 19. The bar lock may be pivoted into engagement with the frame of said stall 5 or 6 to prevent accidental movement of the feed box. Between the rear arches 12 and 12a of the stalls 5 and 6, and the front arches of the second pair of stalls 8 and 9 is another track 15 on which are mounted another pair of feed boxes 16 and 17.

As best seen in Figs. 2 and 3, for each pair of feed boxes 16 and 17 there is provided a feed hopper 26 the outlet of which feeds into a feed delivery device, indicated generally at 27, having a discharge box 28. The feed delivery device 27 has a screw feed 29 which may be operated by a handle 30 to deliver feed from the hopper and through the discharge box 28. The feed delivery device 27 is supported by means of an arm 31 having a clamp 32 which fastens onto the front arch 10 of the feeding stall 5. The feed hopper and feed delivery device as described up to this point are conventional, and it is the modification of the feed delivery device 27 in the respects which are about to be described which makes possible the novel combination of this invention.

As best seen in Fig. 5 the lower end of the feed delivery device 27 and the discharge box 28 are provided with a pair of mounting plates 33 which serve to receive the support arm 31 and which also act as the mount for a delivery chute 34 which is pivotally mounted on the mounting plates 33 by means of rear straps 35 which receive a long stove bolt 36. The delivery chute 34 is provided with an upright arm 37 on the upper end of which is mounted a counterweight 38. The delivery chute 34 may be pivoted from the full line position of Fig. 5 in which it projects into a feed box to deliver feed thereto to the upright broken line position of Fig. 5 in which it is clear of the feed box to permit the feed box to be moved back and forth on the track 15. The counterweight 38 serves to retain the delivery chute 34 in its vertical dotted line position, and may conveniently be used as a handle for pivoting the chute 34 between its feed delivery and retracted positions.

The combination of the feed hopper 26, feed delivery device 27 and delivery chute 34 which are in a clear part of the alley 7 constitute a feed delivery assembly 39, and for convenience of terminology the area in the alley 7 immediately beneath the track 15 and adjacent the feed delivery assembly 39 is referred to as a filling station, and is designated generally by the numeral 40.

As seen in Figs. 1 and 2, the feed delivery device 27 is very close to one side of the alley 7, and is relatively narrow so as not to obstruct the free use of the alley, which is an alley through which traffic moves.

As seen in Fig. 1, the feed stalls 8 and 9 are provided with an identical feed delivery assembly 39 which is adapted to deliver feed into a feed box at a second filling station 40. As seen in Fig. 1 the feed box 16 for the stall 5 is at the filling station while the feed box 17 for the stall 9 is at the filling station, the other feed box of each pair in each case being in feeding position at the end of the stall.

The operation of the unit is believed to be clear from the foregoing description. The feed hopper 26 is normally kept filled with feed in the usual manner. The delivery chute 34 normally is kept in the upright dotted line position shown in Fig. 5. At milking and feeding time the feed boxes 16 for the stalls 5 and 8 may be moved to their respective filling stations 40, the delivery chutes 34 pivoted so that their free ends project into the feed boxes 16, and feed may be moved from the hoppers through the delivery chutes 34 into the feed boxes 16 by turning the cranks 30 for the screw feeds 29. Customarily each feed delivery device 27 is so proportioned that each turn of the crank delivers a predetermined amount of feed to the box, so that the delivery device acts as a feed meter. When the desired amount of feed has been delivered to the feed boxes 16 the delivery chutes 34 may be returned to their upright, retracted position by using the counterweight 38 as a handle. The feed box 16 for the stall 5 may then be rolled on the track 15 into its position across the end of the stall, a cow may be permitted to enter that stall, the feed box 16 for the stall 8 may be rolled into place behind that cow and a second cow permitted to enter the stall 8. The feed boxes 17 for the stalls 6 and 9 may then be moved to the filling stations to be loaded from the feed delivery assemblies 39, and the process is carried out for the stalls 6 and 9. In the meantime the cows in the stalls 5 and 8 are eating and being milked; so that ordinarily the cows are ready to leave stalls 5 and 8 at about the same time, and some time later the cows are ready to leave the stalls 6 and 9. This provides a natural staggering of the work load in the feeding and milking operation.

As soon as the cow in the stall 5 is through feeding and milking the feed box 16 for that stall may be returned to the filling station 40, permitting that cow to leave the stall; and when the cow in the stall 8 is through, the feed box 16 for that stall is moved to its filling station and she leaves by passing through the stall 5. The operation as above described is repeated on the two tandem sets of stalls until all the herd are fed and milked.

With a large herd three or more stalls may be used on each side of the alley.

The foregoing detailed description is given for clearness of understanding only and no unnecessary limitations are to be understood therefrom, as some modifications will be obvious to those skilled in the art.

I claim:
1. In a cattle feeding device having a pair of feeding stalls on opposite sides of an alley with their ends substantially aligned: a feed box at an end of each feeding stall which is mounted for movement to a filling station in the alley close to one of the stalls; and a feed delivery assembly positioned in said alley to deliver feed to a feed box at said filling station, said assembly including a relatively narrow feed delivery device which is close to one stall and has a portion which is movable between a position projecting into a feed box in said station and a retracted position.

2. In a cattle feeding device having a pair of feeding stalls on opposite sides of an alley with their ends substantially aligned: a feed box at the forward end of each feeding stall, said feed boxes being mounted for movement to a filling station in the alley close to one of the stalls; a feed hopper positioned above said alley; relatively narrow feed delivery means positioned at a side of the alley adjacent the filling station to receive feed from said hopper; and a delivery chute mounted on said feed delivery means to receive feed therefrom, said chute being movable between a delivery position projecting into a feed box at said filling station and a retracted position.

3. The device of claim 2 in which a track is mounted above the ends of the feeding stalls, and the feed boxes are mounted on carriages on said track.

4. In a cattle feeding device having a pair of feeding stalls on opposite sides of an alley with their ends substantially aligned: a feed box at an end of each feeding stall which is mounted for movement to a filling station in the alley, said feed boxes having generally rectangular metal frames with straight upright side portions which extend above the level of the delivery chute and having only the side toward the stall open, said feed boxes being identical in construction; and a feed delivery assembly positioned in said alley to deliver feed to a feed box at said filling station, said assembly having a portion which is movable between a position projecting into the open side of a feed box in said station and a retracted position.

5. In a cattle feeding device having a pair of feeding stalls on opposite sides of an alley with their ends substantially aligned: a track mounted above the aligned ends of the feeding stalls; a pair of identical feed boxes mounted on wheeled carriages on said track for movement between positions at the ends of said feeding stalls and a filling station in the alley, said feed boxes having generally rectangular metal frames which are secured to the carriages at their upper ends and have straight upright side portions, and having only the side toward the stall open; a feed hopper positioned above said alley; feed delivery means positioned to receive feed from said hopper; and a delivery chute mounted on said feed delivery means to receive feed therefrom, said chute being mounted for movement between a delivery position projecting into the open side of a feed box at said filling station and a retracted position.

6. In a cattle feeding device having a pair of feeding stalls on opposite sides of an alley with their ends substantially aligned: a feed box closing the forward end of each feeding stall which is mounted for lateral movement to a filling station in the alley; and a single feed delivery assembly positioned above said alley and having a feed outlet portion which is adapted to deliver feed from said assembly directly into a feed box at said filling station.

7. In a cattle feeding device having a pair of feeding stalls on opposite sides of an alley with their ends substantially aligned: a feed box at the forward end of each feeding stall, said feed boxes being mounted for movement to a filling station in the alley; a feed hopper positioned above said alley; feed delivery means positioned to receive feed from said hopper; and a delivery chute pivotally mounted at the lower end of said feed delivery means to receive feed therefrom, the pivotal mounting of said chute permitting movement thereof between an inclined delivery position with its outer end projecting into the front of a feed box at said filling station and a retracted position.

8. The device of claim 7 in which the delivery chute may be pivoted to a substantially vertical retracted position to clear the front of a feed box, and is provided with a counterweight which retains it in said vertical position.

References Cited in the file of this patent

UNITED STATES PATENTS

| | | |
|---|---|---|
| 238,304 | Osterberg | Mar. 1, 1881 |
| 1,437,004 | Neumann | Nov. 28, 1922 |
| 1,518,664 | Maryott | Dec. 9, 1924 |
| 2,593,597 | Palmer | Apr. 22, 1952 |

FOREIGN PATENTS

| | | |
|---|---|---|
| 444,477 | Great Britain | Mar. 13, 1936 |